Feb. 19, 1935.  W. S. PRITCHARD  1,991,521
WINDSHIELD CONTROL MECHANISM
Filed Aug. 4, 1930   2 Sheets-Sheet 1
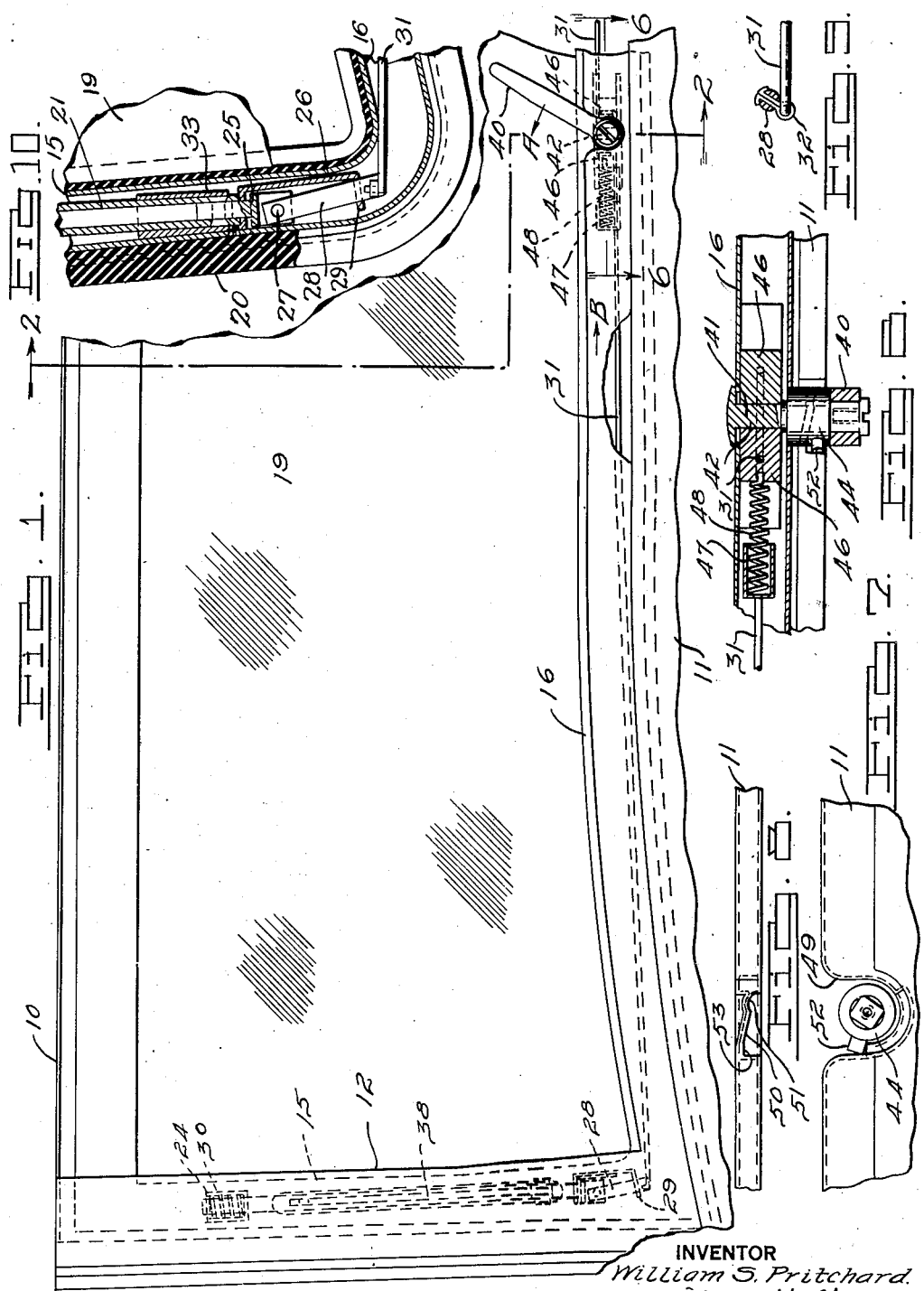
INVENTOR
William S. Pritchard.
BY Whittemore Hulbert
Whittemore & Belknap
ATTORNEYS.

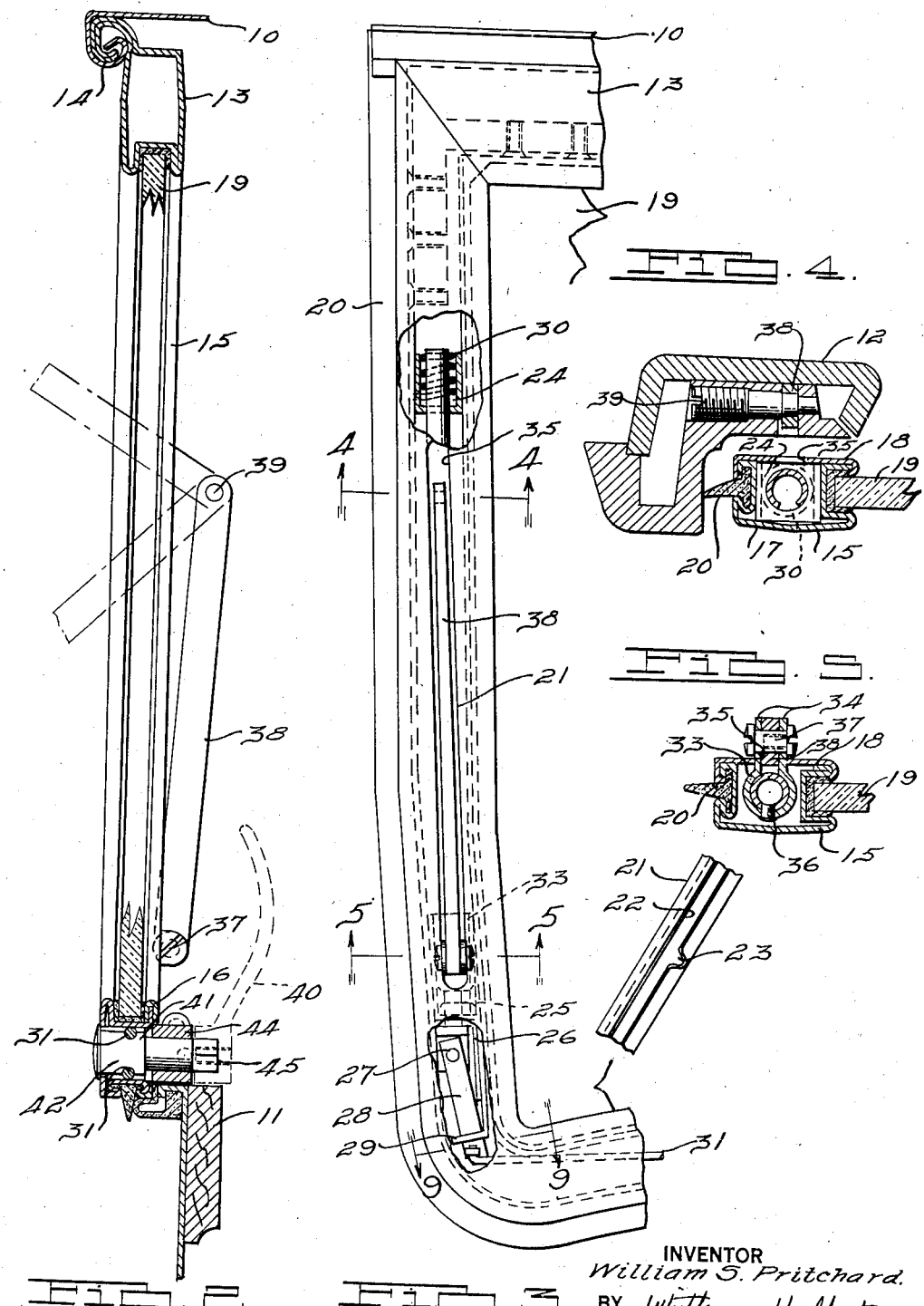

Patented Feb. 19, 1935

1,991,521

UNITED STATES PATENT OFFICE 1,991,521

WINDSHIELD CONTROL MECHANISM

William S. Pritchard, Detroit, Mich., assignor to Motor Products Corporation, Detroit, Mich., a corporation of New York Application August 4, 1930, Serial No. 473,045

6 Claims. (Cl. 296—84)

This invention relates to windshields and more particularly to control mechanisms for windshields of the horizontally pivoted swinging type.

The invention has as one of its principal objects to provide a windshield control mechanism, the greater portion of which is contained within and operates within the frame of the windshield whereby the operating parts thereof are concealed from view and the symmetry of appearance of the windshield and surrounding structure is unimpaired.

Another object of this invention is to provide a windshield control mechanism by means of which the windshield may be adjusted to various positions and maintained securely in these adjusted positions.

The several objects, advantages and novel details of construction of this invention will be made more apparent as this description proceeds, especially when considered in connection with the accompanying drawings, wherein Figure 1 is a fragmentary elevational view showing a windshield constructed in accordance with my invention, mounted in place on a vehicle body;

Figure 2 is a vertical sectional view taken substantially on the plane indicated by line 2—2 in Figure 1;

Figure 3 is an enlarged view partly in section and partly in elevation of the windshield frame at one side thereof;

Figure 4 is a transverse sectional view taken substantially on the plane indicated by line 4—4 in Figure 3;

Figure 5 is a detail sectional view taken substantially on the plane indicated by line 5—5 in Figure 3;

Figure 6 is a detail horizontal sectional view taken substantially on the plane indicated by line 6—6 in Figure 1;

Figure 7 is a fragmentary elevational view showing the locking cam operated by the actuating handle;

Figure 8 is a plane view of the structure illustrated in Figure 7,

Figure 9 is a detail sectional view taken substantially on the plane indicated by line 9—9 in Figure 3, and Figure 10 is a sectional elevational view through the lower end of one of the latch bars.

Referring now particularly to the drawings wherein like reference characters indicate like parts, there is illustrated a portion of a header 10 of a motor vehicle, a sill 11 and side pillars 12, which together substantially define the opening to be closed by the windshield. The windshield consists of a top frame member 13 having a horizontally extending hinge connection 14 with the header 10 so that the windshield is capable of swinging movement; also side frame members 15 and a bottom frame member 16. Only half of the windshield is shown in Figure 1, but as the other half is a duplicate of the half shown, it has been omitted from the drawings.

By reference to and a comparison of Figures 2, 4 and 5 it will be noted that the side frame members 15 and the lower frame member 16 of the windshield are each composed of a hollow tubular member 17 open at one side, this open side being closed by a snap-on cover or the like 18. One longitudinal edge of the tubular member 17 is provided with a glass receiving channel for receiving the windshield glass 19 and the opposed edge is provided with a weatherstrip receiving portion for receiving a weatherstrip 20.

The greater portion of the operating parts of the windshield are contained within the hollow frame members 15 and 16 and by providing these frame members with removable cover portions 18, the mechanism may be conveniently assembled therein and then enclosed by snapping in place the covers 18.

By reference particularly to Figure 3 it will be noted that in each of the side frame members 15 there is a tubular member 21 constituting a latch bar, the same being provided with a longitudinally extending slot 22 provided at spaced points throughout its length with laterally extending offsets or slots 23. This tubular member is rotatably mounted at its upper end in a bracket 24 secured within the windshield frame member, and at its lower end the tubular member 21 is provided with an extension 25 which is rotatably mounted in a bracket 26 secured within the windshield frame. The lower end of the extension 25 is bifurcated and has pivotally connected thereto as at 27 a link 28 which is rotatably journaled in a lateral extension 29 on the lower end of bracket 26.

A spring 30 surrounds the member 21 at the top thereof and has one end fixed thereto and one end fixed to the bracket 24. This spring tends to rotate the member 21 in one direction.

The member 21 is rotated against the action of spring 30 by means of a rod 31 which engages a lateral extension 32 on the lower end of the link 28, see particularly Figure 9.

Surrounding the latch bar member 21 is a substantially U-shaped bracket 33, see Figures 3 and 5. This bracket is provided with a pair of spaced ears or arms 34 which project outwardly to the outside of the windshield frame through a longitudinal slot 35 formed therein. This bracket 33 is provided with a pin 36 adapted to work longitudinally in the slot 22 of the latch bar and when the latch bar is rotated to enter one of the registering lateral slots 23.

Pivotally connected to the spaced arms 34 of the bracket 33 as at 37, is a link or arm 38 which has its other end pivotally connected as at 39 to the corresponding side pillar 12. The laterally extending slots 23 are so located with respect to the length of the member 21 that the pin 36 of the bracket 33 will register with one of these slots 23 in the closed position of the windshield and also with other of these slots 23 when the windshield has been adjusted to different open positions. Whenever the pin 36 is brought opposite to one of the lateral slots 23, the spring 30 will rotate the member 21 to cause the pin to enter the slot 23, thus holding the windshield from further movement until the latch bar 21 has been rotated to free the pin 36 from the slot 23.

For rotating each member 21 against the action of its spring 30 for the previously described purpose, I provide an operating handle 40 arranged substantially centrally of the windshield. Rotatably journaled in the lower windshield frame member 16 is a cam member indicated generally by the reference character 41, see particularly Figures 2 and 6. This cam member has a flattened or cam portion 42 and a reduced portion upon which a bushing 44 is placed, the handle 40 being secured to the end 45 of this cam member. On each side of the flattened or cammed portion 42 is a cam block 46 to which one of the rods 31 is attached. The cam portion 42 acts to move the cam blocks 46 apart so that a movement of the handle in the direction indicated by arrow A pulls the rods 31 in the direction of arrows B, see particularly Figure 1. Fixed to one of the rods 31 is a spring retainer in the form of a cup-like member 47 within which one end of the spring 48 is placed. The other end engages the adjacent cam block 46 and the tendency of the spring 48 is to move the cam blocks towards one another and to hold them in engagement with the cam portion of the cam member.

The end of rod 31 to the right in Figures 1 and 6, passes over the cam 41 and engages the cam block 46 to the left. The cup-like member 47 is fixed to the left hand rod 31 and this rod passes under cam 41 and is attached to the right hand cam block 46. Thus a single spring acts to hold both cam blocks in engagement with cam 41.

By reference to Figures 7 and 8 it will be noticed that the sill member 11 is recessed or cut away as at 49 to accommodate the cam member 41 and the adjacent face of the cut away portion 49 is provided with an inclined cam surface 50 terminating in a shallow recess 51. Carried by the cam member 41 is a radially extending cam pin 52 which is rotated when the handle 40 is rotated. When the windshield is closed the handle may be rotated to cause this pin 52 to engage the inclined surface 50 at the point 53 and by the continued rotation of the handle the pin is caused to travel along the inclined surface 50 which acts to draw the windshield tightly against the frame members around the windshield opening, the handle being rotated until the pin 52 enters the recess 50 whereupon the windshield is locked in closed position, this camming action resulting from an engagement of the cam pin 52 with the cam surface 50 acting to compress or deflect the weatherstrip 20 against the adjacent frame surface so that a water-tight seal throughout the periphery of the windshield is provided.

The operation of the device will be apparent. From closed position the windshield is first unlocked by rotating the handle 40 to cause the pin 52 to clear the cam surface 50 and at the same time to actuate the rods 31 which rotate the latch bars 21 at both sides of the windshield which disengages the lateral slots 23 upon the pins 36. Thereupon these pins are in alignment with the longitudinal slots 22 in the members 21. The windshield may thereupon be pushed or swung outwardly and if the handle is not held to resist the turning movement of the springs 30, when the pins 31 come into registration with the next lateral slots 23, the springs 30 will partially rotate the members 21 and the windshield will be locked in this position. Obviously, the windshield can be adjusted and held in as many positions as are provided for by a corresponding number of the lateral slots 23. To close the windshield, the operation is reversed and the handle 40 is operated to rotate the latch bars 21 to position the pins 36 in the longitudinal slots whereupon the windshield may be moved to closed position and locked by engagement of the cam pin 52 with the cam surface 50.

Obvious modifications may suggest themselves to those skilled in this art and to this end reservation is made to make such changes as may come within the purview of the accompanying claims.

What I claim as my invention is:

1. In a windshield control mechanism, a swingingly mounted windshield, a link pivoted to a fixed support, a member carried by said windshield provided with a longitudinally extending slot having short slots extending laterally therefrom, means slidably connecting the end of said link to said member including means working in said slots, and means for actuating said member to permit the adjustment of said windshield and to hold said windshield in its adjusted positions.

2. A windshield control mechanism including, a swingingly mounted windshield, an arm pivotally connected to a fixed support, a latch bar carried by said windshield and provided with a longitudinal slot and lateral slots communicating therewith, means connecting the end of said arm to said latch bar including a pin working in said slots, means normally rotatably urging said latch bar in one direction, means on said windshield remote from said latch bar and means connecting the latter means to the latch bar for rotating said latch bar in the other direction, for the purpose set forth.

3. In a windshield control mechanism, a swingingly mounted windshield including a frame, an arm pivoted to a fixed support, a rotatable latch bar in said windshield frame at one side thereof, means for slidably connecting the end of said arm to said latch bar including a pin carried by one of said members working in longitudinal and lateral slots carried by the other; and latch bar operating means mounted on said windshield remote from said latch bar and connected to said latch bar by means extending through said windshield frame for rotating said latch bar, for the purpose set forth.

4. A windshield control mechanism including, a swingingly mounted windshield having a frame, a link pivoted at one end to a fixed support, a latching member mounted within said frame at one side thereof, said member being provided with a longitudinally extending slot and with laterally extending slots communicating with said longitudinal slot, means slidably connecting the other end of said link to said latching member including a pin working in said slots, means for normally rotatably urging said latching member in one direction, a remote control means, and means connecting said control means to said latching member for rotating said latching member in the other direction, for the purpose set forth.

5. A windshield control mechanism including a swingingly mounted windshield having a frame, a link pivoted at one end to a fixed support, a latching member mounted within said frame at one side thereof, said member being provided with a longitudinally extending slot and with laterally extending slots communicating with said longitudinal slot, means slidably connecting the other end of said link to said latching member including a pin working in said slots, means for normally rotatably urging said latching member in one direction, a manually operated handle mounted on said windshield remote from said latching member and means extending through said windshield framing and connecting said handle to said latch member for rotating said latching member in the other direction.

6. A windshield control mechanism including, a windshield having a frame, a supporting frame, means swingingly mounting said windshield on said supporting frame, an arm pivotally connected to said supporting frame, a latching member arranged within said windshield frame and provided with a longitudinal slot and with lateral slots communicating with said longitudinal slot, means slidably connecting the end of said arm to said latching member including a bracket pivotally connected to said arm and slidably engaging said latching member, a pin carried by said bracket working in said slots, means for normally rotatably urging said latching member in one direction, a handle rotatably mounted on said windshield, means connecting said handle to said latching member for rotating said latching member in the other direction, said latching member and operating means permitting the adjustment of said windshield and acting to secure said windshield in its adjusted positions, and means carried by said handle and engaging said supporting frame for securing said windshield in its closed position.

WILLIAM S. PRITCHARD.